July 22, 1924.
E. FRENCH
1,502,242
HOLDER FOR MILK BOTTLES AND THE LIKE AND METHOD OF MAKING SAME
Filed Dec. 9, 1922
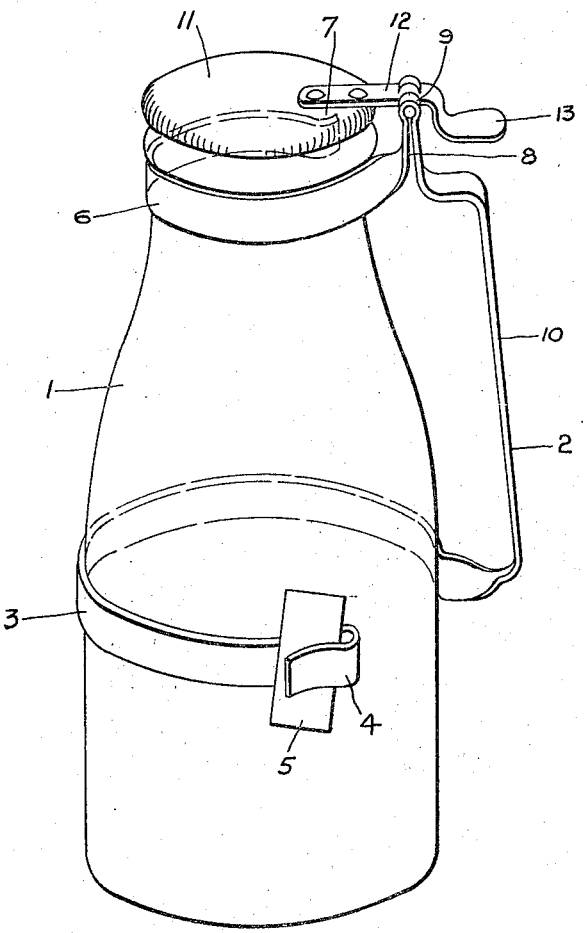
INVENTOR
EARL FRENCH
BY *[signature]*
ATTORNEYS Patented July 22, 1924.

1,502,242

UNITED STATES PATENT OFFICE.

EARL FRENCH, OF VANCOUVER, BRITISH COLUMBIA, CANADA.

HOLDER FOR MILK BOTTLES AND THE LIKE AND METHOD OF MAKING SAME.

Application filed December 9, 1922. Serial No. 605,917.

*To all whom it may concern:*

Be it known that I, EARL FRENCH, a resident of the city of Vancouver, in the Province of British Columbia, Canada, have invented certain new and useful Improvements in Holders for Milk Bottles and the like and Methods of Making Same, of which the following is a specification.

My invention relates to improvements in holders for milk bottles and the like, and a method of making same, the objects of the invention being first to provide a convenient holder which may be readily attached or detached from bottles of different sizes so that the bottle may be more conveniently handled, and with which is incorporated means for preventing the contamination of the contents by flies or other insects, and which consists essentially of a piece of stock bent to form two clips for the engagement of the bottle and an intermediate portion forming a handle, which handle is surmounted by a hinged cap, as will be more fully described in the following specification in which:—

The drawing is a perspective view of my holder.

In the drawing like characters of reference indicate corresponding parts in the drawing.

The numeral 1 indicates a milk bottle, 2 indicates in general my holder of which 3 is a clip formed with one end portion of a piece of stock by bending it in a circular manner to engage the body of the bottle. 4 is a ticket grip formed by bending the free extremity of the clip portion 3 back upon itself, and in which a milk ticket 5 may be held. 6 is a clip formed with the opposite end of the piece of stock by bending it in a circular manner in the opposite direction to the clip 3, for the purpose of engaging the neck of the bottle. 7 is an outwardly turned lip at the free extremity of the clip portion 6 by which the clip may be sprung from the bottle when desired.

8 is an intermediate portion of the piece of stock bent upwards and back upon itself to form a hinge barrel 9. 10 is preferably a straight intermediate portion forming the handle for the holder.

11 is a disc dished to conform to the top of the bottle. 12 is a lever riveted at one end to the disc 11 and which is fulcrumed intermediate its length within the hinge barrel 9 and having its opposite end forming a thumb piece 13 by which the cap can be raised above the top of the bottle when pouring out its contents.

Having thus described the several parts of my invention I will now explain the manner in which it would be used, taking as an example a holder adapted for holding milk bottles.

To attach the handle to a milk bottle, it suffices to place the clip 3 over the bottle, holding the handle portion 10 at an inclination until the clip 6 is in the desired position, when the clip 6 is sprung onto the bottle.

To detach the holder from a bottle it suffices to spread the clip 6 by exerting a pull upon the lip 7 and the handle 10 simultaneously and lift the holder clear of the bottle.

It is desired to point out that the variation in sizes of milk bottles of varying capacity is only manifested in the diameter of the body portion, hence it will be seen that the spring clip 3 may readily conform to the different diameters of the body portion.

It will thus be seen that I have invented a holder for bottles which is strong and convenient, which provides a simple and effective holder for a milk ticket, and a sanitary cap to exclude insects from the neck of the bottle.

What I claim as my invention is:

A bottle holder comprising a single strip of metal bent to provide a handle member having its lower end turned substantially at right angles and curved to provide a bottle embracing clip of circular formation, the end of said clip being bent upon itself to provide a ticket holder, the upper end of said handle being bent upon itself to provide a vertical supporting standard and a curved clip extending therefrom and a lever pivoted to said standard and carrying a cap at one end.

Dated at Vancouver, B. C., this 16th day of November, 1922.

EARL FRENCH.

Witnesses:
S. WARD,
ERNEST E. CARVER.